(12) United States Patent
Velthaus et al.

(10) Patent No.: US 11,035,449 B2
(45) Date of Patent: Jun. 15, 2021

(54) TORQUE CONVERTER DEVICE, IN PARTICULAR FOR A DRIVE TRAIN OF A MOTOR VEHICLE

(71) Applicant: DAIMLER AG, Stuttgart (DE)

(72) Inventors: Jan Velthaus, Stuttgart (DE); Bernhard Ziegler, Rechberghausen (DE); Tobias Schuster, Esslingen (DE); Lukas Rube, Stuttgart (DE); Kai Heukelbach, Köngen (DE); Bernd Koppitz, Winterbach (DE); Felix Zehren, Stuttgart-Wangen (DE)

(73) Assignee: DAIMLER AG, Stuttgart (DE)

( * ) Notice: Subject to any disclaimer, the term of this patent is extended or adjusted under 35 U.S.C. 154(b) by 186 days.

(21) Appl. No.: 16/466,768

(22) PCT Filed: Sep. 18, 2017

(86) PCT No.: PCT/EP2017/001099
§ 371 (c)(1),
(2) Date: Feb. 3, 2020

(87) PCT Pub. No.: WO2018/103869
PCT Pub. Date: Jun. 14, 2018

(65) Prior Publication Data
US 2020/0208723 A1    Jul. 2, 2020

(30) Foreign Application Priority Data

Dec. 9, 2016  (DE) .................... 10 2016 014 725.3

(51) Int. Cl.
*F16H 45/02*    (2006.01)
*F16H 41/30*    (2006.01)
*F16H 41/24*    (2006.01)

(52) U.S. Cl.
CPC ............ *F16H 45/02* (2013.01); *F16H 41/30* (2013.01); *F16H 2041/243* (2013.01); *F16H 2045/0215* (2013.01); *F16H 2045/0284* (2013.01)

(58) Field of Classification Search
CPC .. F16H 45/02; F16H 41/30; F16H 2045/0215; F16H 2045/0284; F16H 2045/021; B60K 6/40
See application file for complete search history.

(56) References Cited

U.S. PATENT DOCUMENTS 3,132,530 A * 5/1964 Le Brise ............... F16H 61/143
74/330
6,258,001 B1    7/2001  Wakuta et al.
(Continued)

FOREIGN PATENT DOCUMENTS

DE    19962507 A1    12/2000
DE    10310423 A1    9/2004
(Continued)

OTHER PUBLICATIONS

International Search Report dated Jan. 3, 2018 in related/corresponding International Application No. PCT/EP2017/001099.
(Continued)

*Primary Examiner* — Charles A Fox
*Assistant Examiner* — Farhana Pervin
(74) *Attorney, Agent, or Firm* — Patent Portfolio Builders PLLC (57) ABSTRACT

A torque converter device for a drivetrain of a motor vehicle includes a converter cover having a cover shell and a hub rigidly connected to the cover shell. The torque converter device also includes at least one multidisk clutch, which (Continued)

includes at least one inner disk-centering member. The hub integrally forms the inner disk-centering member of the multidisk clutch.

10 Claims, 3 Drawing Sheets

(56) References Cited

U.S. PATENT DOCUMENTS

| | | | |
|---|---|---|---|
| 7,011,196 B2 | 3/2006 | Sudau | |
| 8,919,510 B2* | 12/2014 | Walker | F16H 41/24 |
| | | | 192/3.3 |
| 2012/0242199 A1 | 9/2012 | Iwase et al. | |
| 2013/0256075 A1 | 10/2013 | Walker | |
| 2017/0260862 A1* | 9/2017 | Steinberger | F16H 41/04 |
| 2017/0268649 A1* | 9/2017 | Matsuda | F16F 15/12366 |

FOREIGN PATENT DOCUMENTS

| | | |
|---|---|---|
| DE | 102007048472 A1 | 4/2009 |
| WO | WO-2013065748 A1 * | 5/2013 ............. F16H 47/06 |

OTHER PUBLICATIONS

Search Report created on Jan. 3, 2017 in related/corresponding DE Application No. 10 2016 014 725.3.
Written Opinion dated Jan. 3, 2018 in related/corresponding International Application No. PCT/EP2017/001099.

\* cited by examiner

TORQUE CONVERTER DEVICE, IN PARTICULAR FOR A DRIVE TRAIN OF A MOTOR VEHICLE

BACKGROUND AND SUMMARY OF THE INVENTION

Exemplary embodiments of the invention relate to a torque converter device and to a motor vehicle transmission comprising a torque converter device.

DE 103 10 423 A1 discloses a torque converter device comprising a converter cover having a cover shell and a hub rigidly connected to the cover shell, and comprising at least one multidisk clutch, which comprises at least one inner disk carrier.

Exemplary embodiments of the invention are directed to providing an advantageously compact and easy-to-install torque converter device.

Exemplary embodiments of the invention are based on a torque converter device, in particular for a drivetrain of a motor vehicle, comprising a converter cover having a cover shell and a hub rigidly connected to the cover shell, and comprising at least one multidisk clutch, which comprises at least one inner disk carrier.

Exemplary embodiments of the invention involve the hub forming the at least one inner disk-centering member of the multidisk clutch. In this case, the inner disk-centering member is part of the inner disk carrier. The hub is preferably integral with the inner disk-centering member of the multidisk clutch. By using the hub as the inner disk-centering member, the component parts on the hub and cover shell can be kept to a minimum. Processing effort for assembling the converter cover can be kept to a minimum. As a result, an advantageously easy-to-install torque converter device can be provided. In addition, additional functions can be integrated in the converter cover. In particular, a compact torque converter device can be provided. In this context, a "torque converter device" is intended to mean in particular at least one part of a torque converter provided to convert, in particular during start-up, a torque of a drive unit into a torque acting on a driven unit connected to the wheels of the motor vehicle. The torque converter device is preferably formed by a torque converter. The torque converter device is preferably provided for a drivetrain of a hybrid motor vehicle. In this context, a "converter cover" is furthermore intended to mean in particular a cover panel of the torque converter device covering at least part of the torque converter device on the drive side. Preferably, this is intended to mean in particular a cover panel provided to engage over a multidisk clutch and/or a turbine of the torque converter device to drive an impeller. The converter cover is preferably driven in at least one operating condition. The converter cover is preferably provided to transmit a drive movement to the impeller in at least one operating condition. Moreover, a "cover shell" is intended in this context to mean in particular a shell- and/or pot-shaped part of the converter cover. Preferably, this is intended to mean in particular part of the converter cover that engages over the multidisk clutch and/or the turbine of the torque converter device in an assembled state. More preferably, this is intended to mean in particular an annular part of the converter cover extending around a hub of the converter cover. The cover shell is preferably formed by an in particular shell- and/or pot-shaped metal sheet. The hub of the converter cover is provided in particular to receive a shaft of the turbine and/or an input shaft of a motor vehicle transmission coupled to the torque converter device. Preferably, the hub is in particular directly or indirectly coupled to a crankshaft of a drive unit, in particular of a motor, of the motor vehicle. An "inner disk carrier" is intended to mean in particular a component of the multidisk clutch that is provided to mount at least one disk, in particular at least one inner disk, of the multidisk clutch for conjoint rotation. Preferably, a component is intended to mean in particular a component that is provided to mount and/or receive radially inner disks of the multidisk clutch for conjoint rotation. "Integral" means an embodiment in a single, non-joined material block, for example by means of production by milling, turning and/or drilling from a material block or by means of production from a cast part and/or by means of production in a single- or multi-component injection molding process. "Provided" is intended to mean in particular specifically designed and/or equipped. If an object is provided for a particular function, this is intended to mean in particular that the object fulfills and/or carries out this particular function in at least one application and/or operating condition.

Exemplary embodiments further involve the hub being connected to the cover shell by a weld seam. The hub is preferably connected to the cover shell by means of a circumferential weld seam. The cover shell is in particular connected to the hub by a radially inner edge. The hub particularly preferably has an annular extension to which the cover shell is welded. As a result, in particular, a particularly reliable connection can be provided between the cover shell and the hub. As a result, a particularly compact connection can in particular be provided. The number of components can in particular be kept to a minimum.

Moreover, exemplary embodiments involve the weld seam being arranged in a radial region of disks of the multidisk clutch. Preferably, this is intended to mean in particular that the weld seam is completely covered by the disks when viewed from an axial direction, in particular along an axis of rotation of the disks. As a result, an advantageous arrangement of the weld seam is in particular achieved. In this context, a "radial region of disks" is intended to mean in particular a cylindrical region extending in parallel with an axis of rotation of the disks of the multidisk clutch and the base of which is formed by the disks of the multidisk clutch. The radial region preferably has a constant cross-section along the axis of rotation of the disks, which cross-section corresponds to the shape of the disks when viewed in a plane perpendicular to the axis of rotation.

Exemplary embodiments also involve the at least one hub having at least one cooling-oil duct, which is provided to supply cooling oil to the multidisk clutch for cooling the at least one multidisk clutch. As a result, cooling oil is in particular reliably supplied to the multidisk clutch. The multidisk clutch may in particular be supplied with cooling oil from within. Due to the design of the hub in part as the inner disk-centering member, cooling oil can be conducted via the cooling-oil duct directly to the disks of the multidisk clutch. In this context, a "cooling-oil duct" is intended to mean in particular a duct provided to conduct cooling oil. Preferably, this is intended to mean in particular a duct through which cooling oil can be conducted passively or actively. The cooling-oil duct is preferably integral with the hub. The cooling-oil duct is particularly preferably formed in the integral hub as a cooling-oil duct bore.

Exemplary embodiments further involve the hub having a stepped contour, the inner disk-centering member being formed on a radially inner step. In this case, the stepped contour and thus the inner step of the hub are integral, which means that the stepped contour is not produced by joining parts, but rather by forming the stepped contour in the integral hub. The hub preferably has different radii in the axial direction, which result in a stepped contour. As a result, in particular various functions can be implemented at the hub. In particular, the inner disk-centering member can be advantageously formed. In this context, a "stepped contour" is intended to mean in particular that an outer contour of the hub forms steps. Preferably, this is intended to mean in particular that the hub has different radii along an axis of rotation of the hub, which radii change in particular abruptly. The hub preferably forms at least two steps each having a substantially constant radius. The at least two steps preferably have a substantially differing radius. A "substantially differing radius" is intended to mean in particular that the smallest radius is at most 95%, preferably at most 85% and particularly preferably at most 75% of the largest radius.

Furthermore, exemplary embodiments involve the hub having a radial formed integrally by the hub for mounting a transmission input shaft. The radial mounting point means a mounting point supporting the transmission input shaft at least in the radial direction. The hub particularly preferably has a mounting point bore for forming the radial mounting point.

Exemplary embodiments also involve the cooling-oil duct leading to the radially inner step of the hub. The cooling-oil duct preferably ends at an outer surface of the radially inner step of the hub. The cooling-oil duct particularly preferably starts in a region of the radial mounting point. As a result, cooling oil can be reliably conducted from an interior of the hub to an exterior of the hub. In this context, a "radially inner step" is intended to mean in particular a step that is different from a step having the largest radius with respect to the axis of rotation. Preferably, this is intended to mean in particular a step having the smallest radius with respect to the axis of rotation of the hub.

Moreover, exemplary embodiments involve the multidisk clutch having at least one actuating piston for actuating the multidisk clutch, which piston is arranged on a radially outer step of the hub. The radially outer step is preferably formed integrally by the hub. As a result, an advantageously compact torque converter device can be provided. In particular, a plurality of functions can be advantageously integrated at the hub. In this context, an "actuating piston" is intended to mean in particular a unit provided to actuate the multidisk clutch. Preferably, this is intended to mean in particular a unit provided to apply a force to disks of the multidisk clutch, in particular transversely to an axis of rotation. The actuating piston is preferably in particular provided to press disks that can be rotated with respect to one another against one another, in order to at least hinder relative rotation. In this context, a "radially outer step" is intended to mean in particular a step that is different from a step, in particular the radially inner step, having the smallest radius with respect to the axis of rotation. Preferably, this is intended to mean in particular a step having the largest radius with respect to the axis of rotation of the hub.

Exemplary embodiments also involve the at least one hub having a pressure-oil duct for the actuating piston, which duct is formed integrally by the hub and leads to the radially outer step of the hub. The pressure-oil duct is preferably provided to supply the actuating piston with pressure oil to actuate the actuating piston. The pressure-oil duct is preferably provided to conduct pressure oil behind the actuating piston and to apply the pressure of the pressure oil thereto in order to actuate the actuating piston. As a result, pressure oil is in particular reliably supplied to the actuating piston. The actuating piston may in particular be supplied with pressure oil from within. In particular, an advantageously high integration of a plurality of functions can be achieved at the hub. In this context, a "pressure-oil duct" is intended to mean in particular a duct provided to conduct pressure oil. Preferably, this is intended to mean in particular a duct through which pressure oil can be passively or actively conducted. The hub preferably has a pressure-oil duct bore to form the pressure-oil duct.

Exemplary embodiments further involve the at least one multidisk clutch being in the form of a converter lockup clutch. As a result, an advantageous and efficient torque converter device can be provided in particular. In this context, a "converter lockup clutch" is intended to mean in particular a clutch of a torque converter provided to bridge torque-converting parts of the multidisk clutch. Preferably, this is intended to mean in particular a clutch that mechanically connects an impeller and a turbine of the torque converter. As a result, in particular a direct mechanical connection is produced between the drive and driven sides of the torque converter, a torque conversion being prevented.

Exemplary embodiments also involve the torque converter device having at least one electric machine arranged at least partly radially outside the converter cover and having at least one rotor. The electric machine preferably at least partly surrounds the converter cover of the torque converter device. The electric machine is preferably formed in particular by an annular electric motor. The electric machine is used in particular to provide a hybrid drive. As a result, an advantageously compact torque converter device can be provided. Due to the compact structure of the converter cover, the electric machine can be particularly advantageously arranged radially outside the converter cover. Due to the small diameter of the converter cover or of the multidisk clutch, in particular more disks are required to constitute the required friction surface. In order to achieve a reliable clutch action on many friction surfaces, in particular the spring regions on the disks and rigidly connected disks are provided. In this context, "radially outside" is intended to mean in particular that a minimum distance between the electric machine and an axis of rotation of the converter cover is greater than a minimum distance between the converter cover and the axis of rotation of the converter cover. The electric machine is preferably arranged in at least one plane intersecting the electric machine and the converter cover and extending perpendicularly to the axis of rotation of the converter cover, starting from the axis of rotation of the converter cover outside the multidisk clutch. There is particularly preferably at least one plane intersecting the electric machine as well as the integral hub and the multidisk clutch and which extends perpendicularly to the axis of rotation of the converter cover. When viewed axially, the electric machine is particularly preferably arranged substantially in an axial arrangement region of the multidisk clutch and in an axial arrangement region of the integral hub. The electric machine preferably substantially encloses the multidisk clutch and the integral hub. Moreover, exemplary embodiments involve the hub of the converter cover being provided to connect the rotor of the at least one electric machine. The hub of the converter cover is preferably provided to connect and center the rotor of the at least one electric machine. The rotor of the electric machine is preferably connected to the hub of the converter cover for conjoint rotation. As a result, an advantageously compactly constructed torque converter device can in particular be provided with an electric machine. In particular, the electric machine can be advantageously integrated in the torque converter device. In particular, an advantageously high integration of a plurality of functions can also be achieved at the hub. The hub particularly preferably has a connection region integrally formed by the hub for connecting the rotor of the electric machine for conjoint rotation and for radial centering said rotor.

According to embodiments the cover shell has at least one step which runs in the circumferential direction and has a receiving region for the electric machine. A minimum distance between the electric machine and the axis of rotation of the converter cover is preferably smaller than a maximum distance, perpendicular to the axis of rotation of the converter cover, between the converter cover and the axis of rotation of the converter cover. The step has in particular a smaller radius than a maximum radius of the converter cover. As a result, in particular an advantageously integrated arrangement of electric machine on the converter cover can be achieved. An advantageously compact torque converter device can be provided in particular.

By using a highly functional hub in the converter cover, the component parts on the hub and cover shell can be kept to a minimum. The functions of the disk carrier, a drive ring and a piston guide are at least partly integrated in the hub. As a result, in particular these parts are no longer required and processing for the assembly of the converter cover is kept to a minimum. By consolidating these functions in the hub, there is free space in the design to integrate the electric machine. The hub may include various functions that appear useful to a person skilled in the art, for example those of centering the multidisk clutch, mounting a drive shaft, sealing at least portions of the multidisk clutch, integrating cooling-oil ducts for the multidisk clutch, integrating pressure-oil ducts for the multidisk clutch, receiving and connecting the multidisk clutch for conjoint rotation, centering, guiding and sealing the actuating piston of the multidisk clutch, providing axial mounting points for adjacent components, centering the system consisting of the converter and the electric machine with respect to the drive unit and/or connecting and centering the rotor of the electric machine for conjoint rotation.

Further advantages can be found in the following description of the drawings. An embodiment of the invention is shown in the drawings. The drawings, the description of the drawings and the claims contain numerous features in combination. A person skilled in the art will also expediently consider the features in isolation and combine them to form further useful combinations.

DETAILED DESCRIPTION

Figure 1:
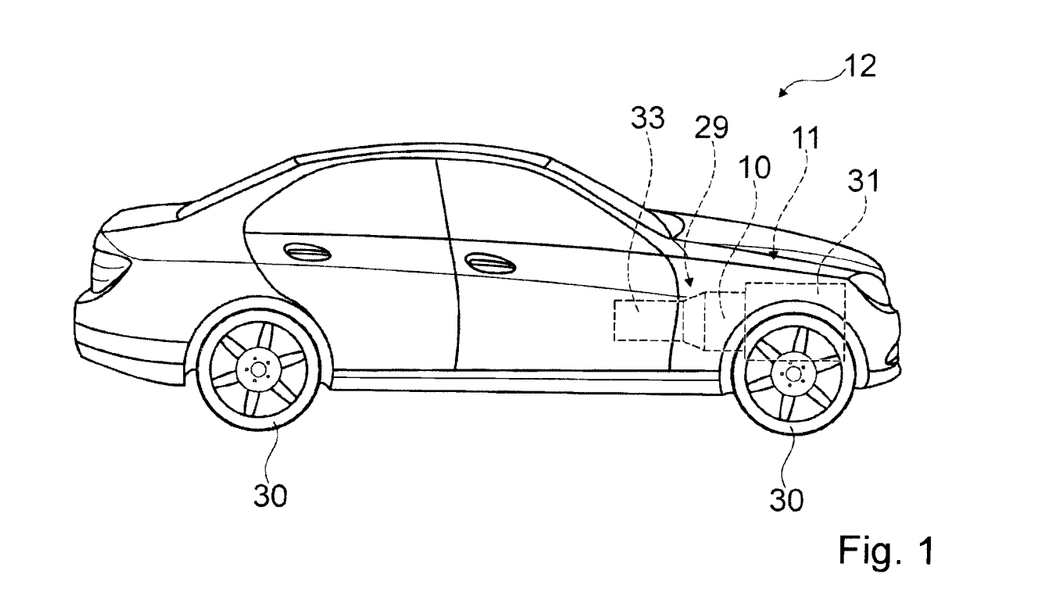
FIG. 1 is a schematic view of a motor vehicle comprising a drive unit and comprising a motor vehicle transmission, which has a torque converter device according to the invention, in a schematic view.
Figure 2:
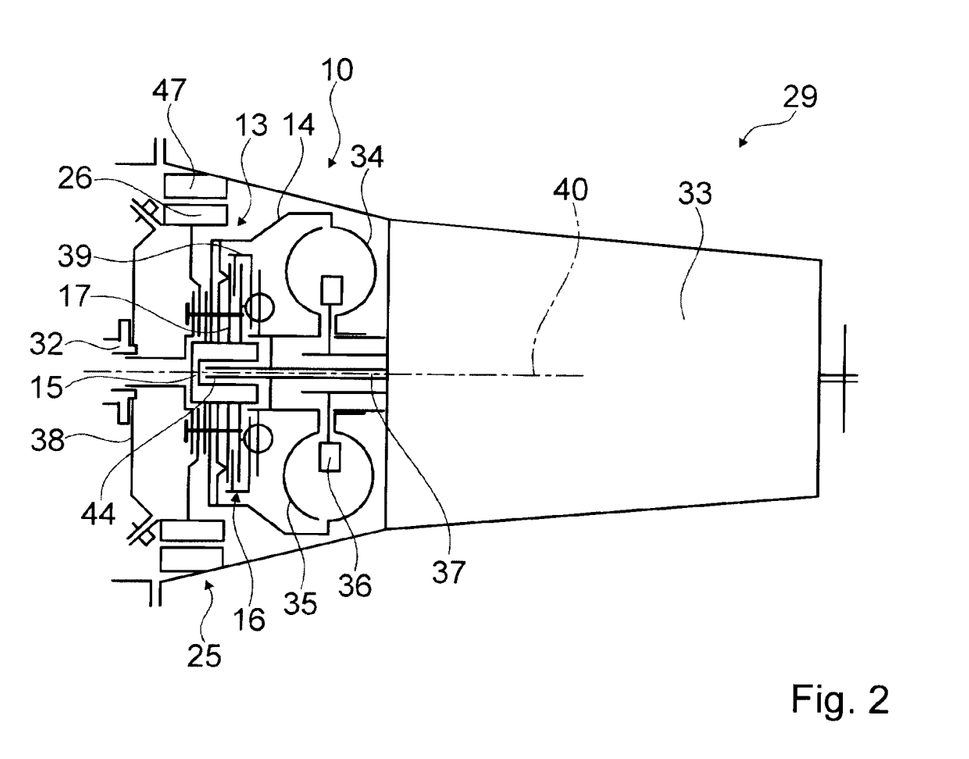
FIG. 2 is a schematic sectional view of the motor vehicle transmission comprising the torque converter device according to the invention.

FIG. 1 schematically shows a motor vehicle 12. The motor vehicle 12 is a hybrid motor vehicle. The motor vehicle 12 comprises a drivetrain 11, by means of which drive wheels 30 (not further visible) of the motor vehicle 12 can be driven. The drivetrain 11 comprises a drive unit 31. The drive unit 31 is an internal combustion engine. The motor vehicle 12 further comprises another drive unit integrated in a motor vehicle transmission 29 of the motor vehicle 12. The additional drive unit forms part of the motor vehicle transmission 29. The additional drive unit is an electric machine 25. The electric machine 25 is an electric motor. The drive unit 31 has a driven crankshaft 32 protruding into the motor vehicle transmission 29. The motor vehicle 12 has the motor vehicle transmission 29. The motor vehicle transmission 29 forms part of the drivetrain 11 of the motor vehicle 12. The motor vehicle transmission 29 is arranged downstream of the drive unit 31 along the drivetrain 11, in particular along a power flow of the drivetrain 11. The motor vehicle transmission 29 is driven by the drive unit 31 in at least one operating condition. The motor vehicle transmission 29 has a torque converter device 10 and an automatic transmission 33. The torque converter device 10 is arranged upstream of the automatic transmission 33 along a power flow. The crankshaft 32 of the drive unit 31 protrudes into the torque converter device 10 of the motor vehicle transmission 29. The torque converter device 10 is provided for the drivetrain 11 of the motor vehicle 12 (FIG. 2).

The torque converter device 10 is preferably a torque converter. The torque converter device 10 comprises an impeller 34, a turbine 35, and a reactor 36, which are provided for hydrodynamic torque transmission. The impeller 34 has a plurality of blades to collect and to accelerate a working fluid, such as in particular an oil. The impeller 34 is provided to be connected to the crankshaft 32 of the drive unit 31 substantially for conjoint rotation. For this purpose, the impeller 34 is connected to a converter cover 13 of the torque converter device 10. The converter cover 13 of the torque converter device 10 is connected in turn to the crankshaft 32 of the drive unit 31 by a flexplate 38 of the torque converter device 10. To transmit the torque supplied by the drive unit 31, the impeller 34 converts a mechanical energy supplied by the drive unit 31 into flow energy. The impeller 34 forms a primary side of the torque converter device 10 (FIG. 2).

The turbine 35 is provided to absorb the flow energy supplied by the impeller 34 and to supply this as mechanical energy. The turbine 35 is connected to a transmission input shaft 37 (not shown in more detail) of the automatic transmission 33 downstream of the torque converter device 10. The turbine 35 forms a secondary side of the torque converter device 10.

The torque converter device 10 further comprises an overrunning clutch to support the reactor 36 so as to be secured to the housing. If the impeller 34 has a higher rotational speed than the reactor 36, the impeller 34 produces a working fluid flow that is diverted to the turbine 35 and to the reactor 36. A torque acting on the reactor 36 is directed in a blocking direction of the overrunning clutch. The reactor 36 is thus arranged so as to be secured to the housing. Due to the doubly-deflected working fluid flow, a torque acts on the turbine 35 that can be greater than the torque supplied by the drive unit 31. If the impeller 34 and the turbine 35 have the same or a similar rotational speed, the torque converter device 10 acts as a hydrodynamic clutch. The reactor 36 is driven by the oil flow. A torque acting on the reactor 36 is directed in an overrunning direction. The reactor 36 corotates.

The torque converter device 10 further has the converter cover 13. The converter cover 13 is provided to engage over the turbine 35 and the reactor 36 and to transmit a drive movement of the drive unit 31 to the impeller 34. The converter cover 13 has a cover shell 14 and a hub 15 rigidly connected to the cover shell 14. The hub 15 is arranged on an axis of rotation 40 of the converter cover 13. The cover shell 14 is substantially shell-shaped. Engaging over is achieved by means of the shell shape of the cover shell 14. The cover shell 14 is connected to the impeller 34 of the torque converter device 10 by a radially outer edge. The cover shell 14 is connected to the impeller 34 for conjoint rotation (this is not further visible). In addition, the cover shell 14 is formed integrally with the hub 15. The hub 15 is connected to the cover shell 14 by a weld seam 18. The weld seam 18 is formed by a circumferential weld seam 18 surrounding the axis of rotation 40 of the converter cover 13 at a defined distance. The cover shell 14 is connected to the hub 15 by a radially inner edge. The hub 15 further has, on its outer surface, an annular extension 41 to which the cover shell 14 is welded by means of the weld seam 18. The extension 41 runs around the axis of rotation 40 (FIG. 3) in the circumferential direction at a defined distance.

Figure 3:
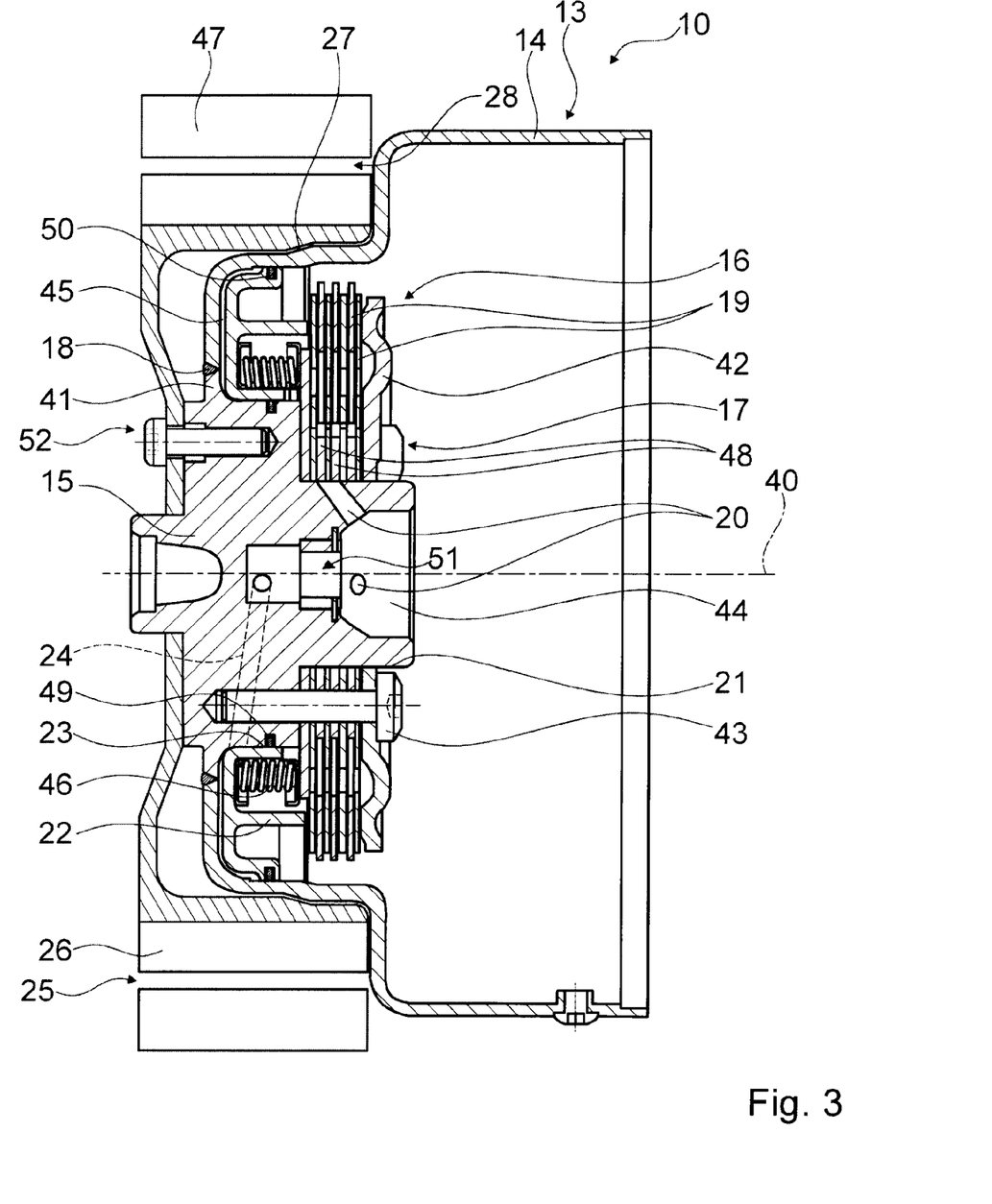
FIG. 3 is a schematic sectional view, along the section line III-III, of the torque converter device according to the invention comprising a converter cover and comprising a multidisk clutch.

The hub 15 further has a stepped contour. A contour of the hub 15 forms at least two steps 21, 23. The outer contour of the hub 15 forms two steps 21, 23. The hub 15 therefore has different radii along the axis of rotation 40 of the converter cover 13, the steps 21, 23 each having an at least substantially constant radius. The hub 15 has a radially inner step 21. The hub 15 further has a radially outer step 23. The annular extension 41 of the hub 15 is arranged on an outer contour of the radially outer step 23. The radially inner step 21 adjoins the radially outer step 23 on a side facing the turbine 35.

The torque converter device 10 further has a multidisk clutch 16. The multidisk clutch 16 is a converter lockup clutch. The multidisk clutch 16 is provided to mechanically interconnect the impeller 34 and the turbine 35. To this end, the multidisk clutch 16 mechanically connects the converter cover 13 to the turbine 35. The multidisk clutch 16 comprises an inner disk-centering member 17. The inner disk-centering member 17 is connected to the converter cover 13 for conjoint rotation. The hub 15 of the converter cover 13 forms the inner disk-centering member 17 of the multidisk clutch 16. The hub 15 is preferably integral with the inner disk-centering member 17. The inner disk-centering member 17 is formed on the radially inner step 21 of the hub 15. The multidisk clutch 16 further has an outer disk carrier 39 that is connected to the turbine 35 for conjoint rotation. The multidisk clutch 16 further has a plurality of disks 19 arranged between the inner disk-centering member 17 and the outer disk carrier 39. The disks 19 comprise at least two inner disks arranged on an inner disk carrier for conjoint rotation, and at least two outer disks arranged on the outer disk carrier 39 for conjoint rotation. The disks 19 comprise a plurality of inner disks arranged on the inner disk carrier for conjoint rotation, and a plurality of outer disks which are arranged on the outer disk carrier 39 for conjoint rotation. The disks 19 of the multidisk clutch 16 that are formed as inner disks are screwed, together with a pressure plate 42 of the multidisk clutch 16, onto the hub 15 of the converter cover 13 by screws 43. The disks 19 of the multidisk clutch 16 that are formed as inner disks are screwed together on the radially inner step 21 in the axial direction against an end face of the radially outer step 23. Spacers 48 are also arranged between the disks 19 formed as inner disks, which spacers space apart the disks 19 formed as inner disks.

The multidisk clutch 16 has many disks 19, as a result of which the disks 19 have to be spaced apart from one another by means of the spacers 48. The disks 19 formed as inner disks are fixed together with the spacers 48. The spacers 48 are formed by connecting portions. The pressure plate 42 is arranged on one side of the disks 19 formed as inner disks. The disks 19 of the multidisk clutch 16 extend annularly around the hub 15 of the converter cover 13. In a non-actuated state of the multidisk clutch 16, the outer disk carrier 39 can be rotated relative to the inner disk carrier.

The multidisk clutch 16 further has an actuating piston 22 for actuating the multidisk clutch 16. The actuating piston 22 extends annularly around the hub 15 of the converter cover 13. The actuating piston 22 is arranged between the hub 15 and an interior of the cover shell 14 so as to be substantially sealed in the radial direction with respect to the axis of rotation 40 of the converter cover 13. The actuating piston 22 rests on an inside of a step 27 of the cover shell 14. The actuating piston 22 is arranged on the radially outer step 23 of the hub 15. The hub 15 forms a lower piston track of the actuating piston 22. The actuating piston 22 is also arranged between the extension 41 of the hub 15 and the disks 19 in the axial direction with respect to the axis of rotation 40 of the converter cover 13. The actuating piston 22 is arranged between the weld seam 18 and the disks 19 in the axial direction with respect to the axis of rotation 40 of the converter cover 13. The weld seam 18 is arranged in a radial region of the disks 19 of the multidisk clutch 16. The weld seam 18 is thus completely covered by the disks 19 when viewed from the axial direction. The pressure plate 42 is arranged on a side of the disks 19 facing away from the actuating piston 22. When the multidisk clutch 16 is actuated, the actuating piston 22 is pressed in the axial direction against the disks 19 such that the inner disks and the outer disks of the disks 19 are frictionally connected. The pressure plate 42 is thus used to apply a force in the opposite direction to the force of the actuating piston 22, which is intended to prevent the disks 19 from pushing away and/or giving way. Due to the structure, the multidisk clutch 16 has an advantageously small diameter (FIG. 3, 4).

Moreover, the hub 15 has at least one cooling-oil duct 20. The hub 15 has a plurality of cooling-oil ducts 20. The cooling-oil ducts 20 are provided to supply cooling oil to the multidisk clutch 16 for cooling the multidisk clutch 16. The cooling-oil ducts 20 are provided to supply cooling oil for cooling the disks 19 of the multidisk clutch 16. The cooling-oil ducts 20 lead to the radially inner step 21 of the hub 15. The cooling-oil ducts 20 each extend from an inner receiving portion 44 of the hub 15 through the hub 15 to the radially inner step 21 of the hub. The cooling-oil ducts 20 are evenly distributed in the circumferential direction. The inner receiving portion 44 of the hub 15 is formed by an axis receiving portion. The inner receiving portion 44 of the hub 15 is arranged in the region of the axis of rotation 40 of the converter cover 13. The inner receiving portion 44 of the hub 15 is rotationally symmetrical with respect to the axis of rotation 40. The inner receiving portion 44 of the hub 15 is used to receive a drive shaft. The inner receiving portion 44 of the hub 15 is used to receive the transmission input shaft 37. In the region of the receiving portion 44, the hub 15 has a mounting point 51 for the transmission input shaft 37.

Moreover, the hub 15 has at least one pressure-oil duct 24 for the actuating piston 22. The hub 15 has a plurality of pressure-oil ducts 24 for the actuating piston 22. The pressure-oil ducts 24 are provided to supply pressure oil for actuating the actuating piston 22. For this purpose, the pressure-oil ducts 24 lead into an at least substantially sealed space 45, which is arranged on a side of the actuating piston 22 facing away from the disks 19. The space 45 is delimited by the actuating piston 22, the hub 15 and the cover shell 14. By applying pressure to the space 45 by means of pressure oil, the actuating piston 22 is actuated. When the pressure drops, the actuating piston 22 is reset by means of a return spring 46. The pressure-oil ducts 24 lead to the radially outer step 23 of the hub 15. The pressure-oil ducts 24 each extend from an inner receiving portion 44 of the hub 15 through the hub 15 to the radially outer step 23 of the hub 15. The pressure-oil ducts 24 are evenly distributed in the circumferential direction.

Two seals 49, 50 are furthermore provided for sealing the space 45. A radially inner seal 49 is arranged in a circumferential groove in the radially outer step 23 of the hub 15. The radially inner seal 49 is provided to seal a gap between the hub 15 and the actuating piston 22. A radially outer seal 50 is arranged in a circumferential groove in the actuating piston 22. The radially outer seal 50 is provided to seal a gap between the actuating piston 22 and the cover shell 14.

Figure 4:
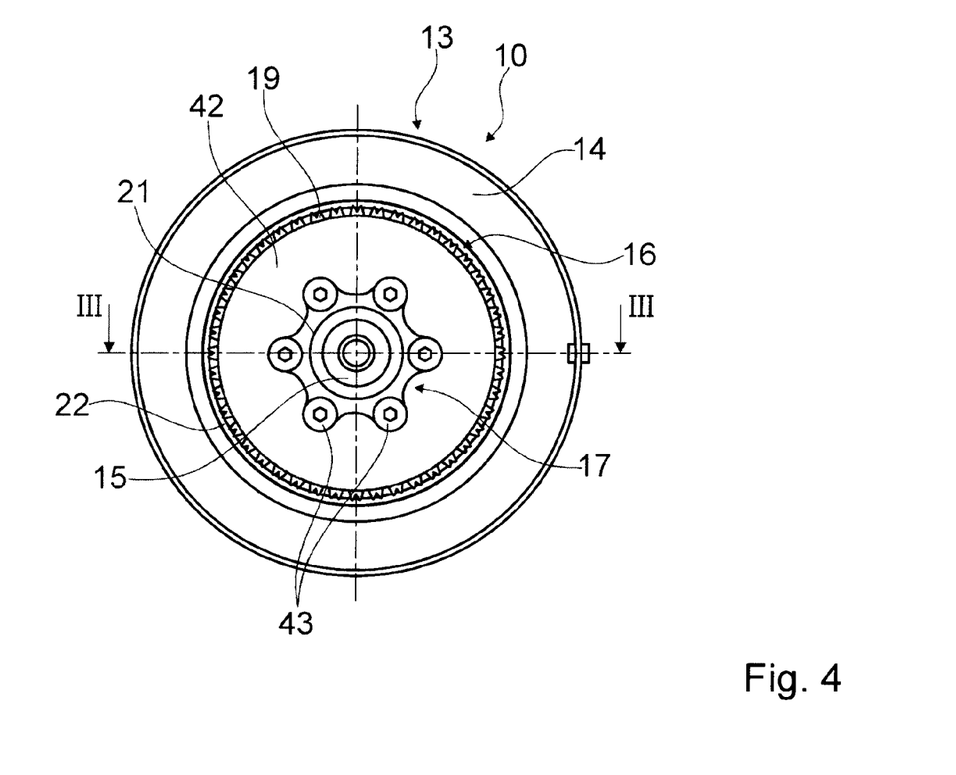
FIG. 4 is a schematic view of the torque converter device according to the invention comprising the converter cover.

The electric machine 25 of the torque converter device 10 is arranged at least partly radially outside the converter cover 13. The electric machine 25 has a rotor 26. The electric machine 25 further has a stator 47. The hub 15 of the converter cover 13 is provided to connect the rotor 26 of the at least one electric machine 25. The hub 15 of the converter cover 13 is provided to connect and center the rotor 26 of the at least one electric machine 25. The rotor 26 is screwed together with the hub 15. The rotor 26 is screwed onto an end face of the hub 15. The cover shell 14 further has the step 27 running in the circumferential direction. The step 27 extends in the axial direction over the actuating piston 22 and the multidisk clutch 16. The step 27 of the cover shell 14 is formed as a receiving region 28 for the electric machine 25. The step 27 of the cover shell 14 is formed at least as a receiving region 28 for the rotor 26 of the electric machine 25. The step 27 forms an annular receiving region 28 that is delimited by two sides by the cover shell 14. The electric machine 25 protrudes partly into the receiving region 28. As a result, a particularly compact arrangement can be achieved. In particular, a diameter of the torque converter device 10 can be kept to a minimum. In particular, the torque converter device 10 can be designed in an advantageously axially compact manner. Due to the compact arrangement of the multidisk clutch 16, the electric machine 25 can be arranged radially around the multidisk clutch 16.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 torque converter device
11 drivetrain
12 motor vehicle
13 converter cover
14 cover shell
15 hub
16 multidisk clutch
17 inner disk-centering member
18 weld seam
19 disk
20 cooling-oil duct
21 step
22 actuating piston
23 step
24 pressure-oil duct
25 electric machine
26 rotor
27 step
28 receiving region
29 motor vehicle transmission
30 drive wheel
31 drive unit
32 crankshaft
33 automatic transmission
34 impeller
35 turbine
36 reactor
37 transmission input shaft
38 flexplate
39 outer disk carrier
40 axis of rotation
41 extension
42 pressure plate
43 screw
44 receiving portion
45 space
46 return spring
47 stator
48 spacer
49 seal
50 seal
51 mounting point of the transmission input shaft
52 connection region

The invention claimed is:

1. A torque converter device for a drivetrain of a motor vehicle, comprising:
a converter cover having a cover shell and a hub rigidly connected to the cover shell; and
at least one multidisk clutch, wherein an inner disk-centering member of the multidisk clutch is integrally formed by the hub,
wherein the hub is connected to the cover shell by a weld seam, wherein the weld seam is spaced axially apart from disks of the at least one multidisk clutch along an axis of rotation of the disks, and wherein a radial distance of the weld seam from the axis of rotation of the disks falls, in relation to the axis of rotation of the disks, between a minimum radial portion of the discs and a maximum radial portion of the discs.

2. The torque converter device of claim 1, wherein the hub has at least one cooling-oil duct integrally formed by the hub and configured to supply cooling oil to the at least one multidisk clutch for cooling the at least one multidisk clutch.

3. The torque converter device of claim 2, wherein the hub has a stepped contour integrally formed by the hub, and wherein the inner disk-centering member is formed on a radially inner step that is integrally formed by the hub.

4. The torque converter device of claim 3, wherein the hub has a radial mounting point configured for mounting a transmission input shaft, and wherein the mounting point is integrally formed by the hub.

5. The torque converter device of claim 4, wherein the cooling-oil duct leads from the radial mounting point to the radially inner step of the hub.

6. The torque converter device of claim 3, wherein the at least one multidisk clutch has at least one actuating piston configured to actuate the multidisk clutch, and wherein the at least one actuating piston is arranged on a radially outer step of the hub, which step is integrally formed by the hub.

7. The torque converter device of claim 6, wherein the hub has a pressure-oil duct configured to actuate the actuating piston, and wherein the pressure-oil duct is integrally formed by the hub and leads to the radially outer step of the hub.

8. The torque converter device of claim 1, wherein the at least one multidisk clutch is a converter lockup clutch.

9. The torque converter device of claim 1, further comprising:
   an electric machine arranged at least partly radially outside the converter cover and having at least one rotor, wherein the hub has a connection region integrally formed by the hub configured to connect the rotor of the electric machine for conjoint rotation and for radial centering the rotor.

10. The torque converter device of claim 9, wherein the cover shell has at least one step running in a circumferential direction and forming a radially supporting receiving region for the rotor of the electric machine.

* * * * *